United States Patent

[11] 3,607,022

| [72] | Inventors | Arnold Hausweiler<br>Dormagen;<br>Norbert K. Mischung, Dormagen-<br>Hackenbroich; Adolf Mayer, Dormagen, all<br>of Germany |
|---|---|---|
| [21] | Appl. No. | 815,593 |
| [22] | Filed | Apr. 14, 1969 |
| [45] | Patented | Sept. 21, 1971 |
| [73] | Assignee | Erdoelchemie Gesellschaft mit<br>beschraenkter Haftung<br>Cologne, Germany |
| [32] | Priority | Apr. 16, 1968 |
| [33] | | Germany |
| [31] | | P 17 68 216.5 |

[54] REMOVAL OF AMMONIA FROM GAS MIXTURES
8 Claims, 1 Drawing Fig.

[52] U.S. Cl............................................................. 23/119, 23/2
[51] Int. Cl........................................................... C01c 1/24
[50] Field of Search............................................ 23/119, 2; 260/465.3, 465.9

[56] References Cited
UNITED STATES PATENTS

| 2,368,901 | 2/1945 | Tiddy............................. | 23/119 |
| 3,255,233 | 6/1966 | Kunze et al..................... | 260/465 |
| 3,408,157 | 10/1968 | Miller et al..................... | 23/119 X |
| 3,462,477 | 8/1969 | Caporali et al. ............... | 260/465 |

Primary Examiner—Oscar R. Vertiz
Assistant Examiner—G. O. Peters
Attorney—Burgess, Dinklage & Sprung ABSTRACT: The removal of ammonia from gas mixtures, such as the reaction gas formed during the production of acrylonitrile by the catalytic oxidation of propylene in the presence of ammonia, by washing the gas mixture with a solution of ammonium sulfate and sulfuric acid to neutralize the ammonia, converting the same to ammonium sulfate while maintaining the ammonium sulfate concentration below the value sufficient to allow substantial crystallization, thereafter admixing the washing solution containing the ammonium sulfate with a second ammonium sulfate solution in which crystal development is occuring, thereby forming well defined ammonium sulfate crystals. The second ammonium sulfate solution is preferably an ammonium sulfate, sulfuric acid solution in an immersion washer, through which a portion of the gas mixture is initially passed. Preferably prior to dividing the gas mixture into the two streams, passing one to the initial washing and the other to the immersion washing, the same is subject to a prewashing with water to remove organic polymers and catalyst dust.

PATENTED SEP 21 1971
3,607,022
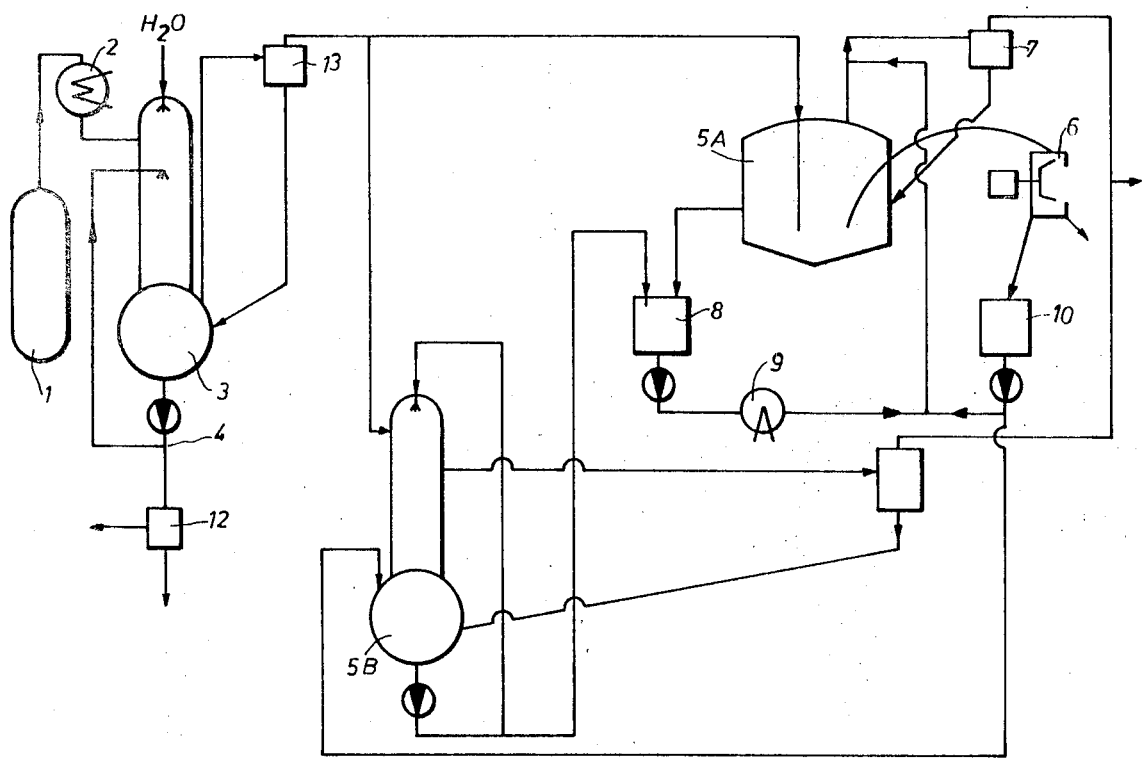
INVENTORS:
ARNOLD HAUSWEILER, NORBERT-KURT MISCHUNG, ADOLF MAYER.
BY:
Burgess, Dinklage & Sprung
Attorneys

REMOVAL OF AMMONIA FROM GAS MIXTURES

This invention relates to the removal of ammonia from the reaction gases such as formed during the production of acrylonitrile.

In conventional processes for the production of acrylonitrile by the oxidation of propylene and ammonia with oxygen on fixed catalysts, the reaction gases contain, in addition to acrylonitrile, hydrocyanic acid and acetonitrile, higher boiling polymeric compounds as well as ammonia. The reaction products may be removed from the gas by washing the reaction gases with water which today is done in almost every acrylonitrile plant (*Chem. Ing. Techn.* 38, 1966, p. 704; *Chem. Ing.* 15 Mar. 1965, pages 150–152, *Plastics Week*, 4th Oct. 1965).

Sulfuric acid has to be added to the water used for washing in such a quantity that all the excess ammonia is combined in the form of ammonium sulfate. In addition to the required reaction products, acrylonitrile, hydrocyanic acid, acetonitrile and ammonia, the high-boiling polymeric compounds are also absorbed by the water during washing so that, following the removal of the acrylonitrile, hydrocyanic acid and acetonitrile, dark aqueous solution of ammonium sulfate and high-boiling polymeric organic compounds is left behind. These dark solutions present considerable difficulties because it is impossible to obtain a crystalline colorless ammonium sulfate from them. For this reason, the solutions can only be disposed off by being sprayed into the combustion chambers of combustion furnaces. Unfortunately, this process involves considerable expense and is inadequate because all the sulfur in the ammonium sulfate appears as sulfur monoxide in the exhaust gases from the combustion furnace.

These difficulties can be obviated in cases where the ammonia is removed by washing the reaction gas in an immersion saturator in which the ammonia neutralized with sulfuric acid accumulates in the form of crystalline ammonium sulfate and not, as described in *Chem. Ing. Techn.* 38, 1966, page 704 and *Chem. Ing.* 15 Mar. 1965, page 150, in the form of an aqueous solution which has to be burnt for example (*Plastics Week*, Oct. 1965).

The use of an immersion saturator for removing ammonia from gases has been known for some time. For decades now, ammonia has been removed in this way from coke gases (cf. Ullman, *Encyclopadie der technischen Chemie*, 3rd Edition, 3rd Volume, pages 615–629).

The immersion saturator consists of circular containers which are filled half with ammonium sulfate solution. Ammonium containing gas is introduced through a centrally located gas pipe into the solution. The gas is removed via an eccentric gas removal pipe in the upper part of the saturator.

Unfortunately, the capacity of even the largest types of immersion saturator is too small for the huge acrylonitrile plants that are in use today. This means that at least two immersion saturators would have to be installed in parallel in large acrylonitrile plants with a yearly output of, for example, 90,000 tons of acrylonitrile, in order to remove ammonia from the reaction gas. Unfortunately, excessive expense would be involved in the installation of this double immersion saturator system.

One object of this invention is the recovery of ammonia as crystalline ammonium sulfate from a reaction gas mixture in a more efficient and economical manner without the above mentioned difficulties.

This and still further objects will become apparent from the following description read in conjunction with the drawing which shows a flowsheet of an embodiment of the process in accordance with the invention.

In accordance with the invention it has been found that the ammonia values can be effectively won as crystalline ammonium sulfate from an ammonia-containing gas mixture if the same is washed in an ordinary washer, such as a jet washer, with a solution of ammonium sulfate and sulfuric acid, to thereby neutralize the ammonia, converting the same to ammonium sulfate while maintaining the concentration of the ammonium sulfate in the washer below the value sufficient to allow substantial crystallization, and thereafter the washing solution is admixed with a further washing solution containing ammonium sulfate and sulfuric acid, as for example in an immersion washer in which crystal development is occurring. The ammonia values recovered in the first washing step are effectively converted during the second washing to well-defined crystals of the required shape and size, as for example predominantly having a grain size between about one-half to 1 millimeter.

Preferably the gas mixture is subjected to an initial cooling and washing to remove organic polymers and catalyst dust, and after entrained droplet removal is divided into two streams, one being passed to the first mentioned washer and the second to the immersion washer in which the crystal development is to occur.

The gas mixture treated is preferably the reaction gas from a process for the production of acrylonitrile from propylene, ammonia and molecular oxygen or air, which reaction gas mainly contains nitrogen, oxygen, propylene, propane and ammonia together with acrylonitrile, hydrocyanic acid, acetonitrile and small quantities of other organic compounds as well as catalyst dust. This gas mixture is cooled and then washed first with water in order to remove organic polymers and catalyst dust. In order to remove the ammonia, the reaction gas is divided into two streams one of which is delivered into a washer in which the ammonia is converted into ammonium sulfate by neutralization with a solution of ammonium sulfate in sulfuric acid, the concentration of ammonium sulfate solution being such that at the very most incipient crystallization occurs. The suspension or solution of ammonium sulfate formed in this washer is then transferred to an immersion washer in which the ammonia is washed out of the other component stream of the reaction gas by neutralization with the ammonium sulfate solution containing sulfuric acid, the ammonium sulfate formed and passed to the immersion washer being developed into crystals of the required shape and size by adjustment of the ammonium sulfate concentration.

The process according to the invention is now described with reference to the accompanying drawing.

The gas leaving the reactor 1 is cooled at 2 to a temperature of from 70° to 300° C. and is delivered at this temperature into a washer 3 which is preferably in the form of a jet washer. In order to minimize the losses of acrylonitrile and hydrocyanic acid when the hot gas comes into contact with the washing solution, it has been found advantageous to initially inject water into the hot gas in such a quantity that the temperature is reduced to about 150° C., and then to combine the cooling water with the washing water containing the polymers and ammonia. The loss of nitrile can be minimized by these measures. The concentration of polymers and catalyst in the water used for washing may increase up to 40 percent by weight, the polymer content usually amounting to between 20 and 30 percent by weight.

The quantity of water discharged with waste to a combustion furnace can be compensated for by the addition of fresh water or waste water from the installation. In other words it is possible here to dispose of water contaminated with organic polymers which would otherwise have to be burnt or purified at considerable expense. Using filters or separators 12, the catalyst dust can be separated almost completely free of polymers from the effluent 4 fed from the washer to the combustion furnace, and subsequently worked up.

The gas leaving the washer is preferably passed through a cyclone separator 13 in which most of the liquid droplets entrained by it are removed. This effect may be intensified by injecting water into the gas before it enters the cyclone separator. Fresh water or waste water from the installation may again be used for this purpose in such a quantity that the losses which the water used for washing suffers through evaporation are just compensated for by cooling water.

In order to remove ammonia, the gas is divided into two streams. The first gas stream, A, is passed through an immersion washer 5A, freed from ammonia and discharged through a drop separator. The solution of ammonium sulfate sulfate in sulfuric acid leaving a second washer 5B, described below, is used as the washing solution, if necessary with some more sulfuric acid added to it. The conventional immersion saturator used as the washer 5A is described, for example, in Ullmann, *Encylopadie der technischen Chemie*, 3rd Edition, 3rd Volume, pages 615–629. In this first washer 5A, ammonium sulfate is formed, being run off and dried in known manner. Small quantities of tarlike polymers may also be removed through the circulation vessel 8. However, the accumulation of tarlike polymers is limited through the presence of the water-injection separator in the gas pipe before the immersion saturator.

The second gas stream, B, is passed through the second washer 5B, in which the gas-containing ammonia is reacted with an unsaturated solution of ammonium sulfate and 3 to 5 percent by weight of sulfuric acid to form ammonium sulfate. This washer 5B may for example be in the form of an immersion washer or a washing column. However jet washer with substantially the following construction has proven particularly advantageous. The jet washer consists of a vessel surmounted by a washing tube some 10 to 20 meters tall. The ammonia-containing gas enters the washing tube at its upper end, flows through it at a high rate and leaves the washer through an outlet in the vessel. Immediately after the inlet, the acid washing solution is injected through nozzles into the gas, flows through the washing tube in parallel current with the gas and is collected in the vessel which has a settling zone and, preferably, arrangements for separating liquid droplets, and reintroducing the same into the washing circuit. For example, 100 to 300 m.$^3$/hr. of an ammonium sulfate solution containing approximately 3 to 5 percent by weight of sulfuric acid may be sprayed through nozzles into the gas in order to remove, for example, between 100 and 500 kg./hr. of ammonia from approximately 50,000 Nm.$^3$ of reaction gas.

The pressure in front of the nozzles may be approximately 1.5 to 3 atm. When operating in this manner no more ammonia can be detected in the reaction gas behind the jet washer.

Sulfuric acid is added to the ammonia washer 5B in such a quantity that the required concentration is retained. The acid washing solution may be enriched with ammonium sulfate to such an extent that it is never quite saturated, although it may even be oversaturated and the salt component allowed to increase, for example, to 20 percent by volume. These crystal free or crystal-containing sulfate solutions are run off and delivered through the vessel 8 and a unit 9 to the other conventional immersion saturator 5A in which the gas stream A is treated. The water introduced from the washer 5B with the sulfate solution is evaporated here, and the ammonium sulfate from both installations is converted into crystals of outstanding quality s regards color and grain size. The water removed from the jet washer with the sulfate solution may be recycled to it in the form of a condensate or sulfate solution from the effluent of the shear centrifuge.

In both washers 5A and 5B a temperature of the washing solutions of 70° to 90° C. is used.

The economic advantage of the process according to the invention is that the costs involved in establishing plants for washing ammonia are considerably lower than for conventional plants. In addition, the outlay involved in maintaining the plant according to the invention is considerably reduced.

The precess described in the foregoing is not limited to the treatment of gas from acrylonitrile installations, but may also be used to remove ammonia from other gases.

Different kinds of gas streams may be treated in the manner described, the gas stream with the lower ammonia content being preferably passed through the jet washer. The gases from two spatially separated existing plants may be treated by installing a conventional immersion saturator in one plant and a jet washer in the other plant, and pumping the almost saturated ammonium sulfate solution from one plant to the other. Unfortunately, this process can be reasons of safety only be recommended in cases where there are at least two immersion saturators with sulfate crystallization in operation.

In conventional processes for the removal of ammonia from reaction gases, it was assumed that the removal of the ammonia from the gas by washing and crystal growth of the ammonium sulfate crystals had to take place in the same vessel and at the same time, and that the crystals had to have a certain average residence time in the vessel if they were to be of the required shape and size. On the strength of this assumption neutralization of all the ammonia present in the gas was always carried out in the vessel in which crystallization was completed. In order to remove ammonia from large quantities of gas, therefore, several immersion saturators have to be operated in parallel with one another. Several immersion saturators arranged in parallel are in fact used in coking plants. Each of these immersion saturators has to be equipped with devices for recirculation, overheating, salt removal and so on, the result of which is that the costs involved in constructing and running installations of this kind are extremely high.

The process according to the invention is based upon the recognition that it is not necessary to pass all, but only some of the ammonia-containing gas through a washer in which crystal growth is taking place at the same time, and that the remaining gas can be washed free of ammonia in an extremely simple washer, for example, a jet washer, and the ammonium sulfate solution formed delivered either free from, or containing, crystals to the first washer with crystal formation.

It must be regarded as extremely surprising that the ammonium sulfate is of almost the same quality in regard to crystal shape, crystal size and purity as the ammonium sulfate obtained by the conventional process.

The following examples demonstrate that an average grain spectrum is developed largely independently of the residence time of the crystals in the saturator, i.e. of the salt, accumulation, and noticeably influenced by drastic, i.e. impracticable, changes in the operating conditions.

EXAMPLE 1

60,000 Nm.$^3$/hr. of a reaction gas from acrylonitrile reactors are washed free of ammonia in a conventional immersion saturator. As washing solution there is used a saturated ammonium sulfate solution which contains 20 to 50 percent by volume of crystalline ammonium sulfate and 2 to 4 percent by weight of sulfuric acid. The temperature of this solution is 80°–93° C. Then 1.6 t/hour of ammonium sulfate accumulate in the saturator. The product has the following grain sizes:

up to 0.2 mm. = 3%
0.2–0.5 mm. = 13%
0.5–1 mm. = 61%
1–2 mm. = 23%

A saturated solution of 1.3 t of ammonium sulfate/hr. is then additionally delivered to the saturator. The washer introduced with the solution is evaporated by raising the temperature in the saturator. Then 2.9 t/hour of ammonium sulfate with the following grain sizes are run off:

up to 0.2 mm. = 4%
0.2–0.5 mm. = 15%
0.5–1 mm. = 62%
1–2 mm. = 19%

EXAMPLE 2

73,000 kg./hr. of a reaction gas from acrylonitrile reactors containing 6,100 kg. of acrylonitrile, 705 kg. of acetonitrile, 1,100 kg. of hydrocyanic acid, 12,000 kg. of water, 180 kg. of ammonia and 300 kg. of polymeric high-boiling organic compounds, together with 10 kg. of catalyst dust, are introduced at 250° C. into the washing tower of a jet washer 3 into which 250 m.$^3$/hr. of an aqueous solution containing 20 percent of organic polymers are sprayed. The reaction gas is cooled to about 82° C. in this jet washer and is carried away through a drop separator. It is free from organic polymers and catalyst dust.

The washing solution is run off from the jet washer to a combustion furnace in such a quantity that the polymer content remains at the required level. The volume in the jet washer is regulated by the addition of about 7 m.³/hr. of a processing water slightly contaminated with organic materials. At least 95 percent of the catalyst discharge can be separated from the washing water delivered to the combustion furnace by means of an automatic centrifuge.

The washed reaction gas is then introduced into the head of a second jet washer 5B in which 200 to 300 m.³/hr. of a 30 to 35 percent solution of ammonium sulfate containing some 3 to 5 percent by weight of sulfuric acid are sprayed. The washed reaction gas is discharged through a drop separator, when it is substantially free of ammonia. The temperature of the gas and the washing liquid is about 82° C.

The ammonium sulfate solution is run off in such a quantity that the concentration of ammonium sulfate remains substantially constant. Sulfuric acid and fresh water, or a slightly contaminated processing water, are introduced into the jet washer.

The solution of ammonium sulfate run off from the sump of the jet washer is delivered into an immersion saturator 5A which is filled with a second gas stream identical in its quantity and composition with the gas stream described earlier on. Before entering the immersion saturator, this gas stream was also washed with water in a jet washer 3 inside which there is a salt sludge of ammonium sulfate with from 3 to 5 percent of sulfuric acid. Then 1,350 kg./hr. of ammonium sulfate with the following grain sizes are run off from this immersion saturator:

up to 0.2 mm. = 3%
0.2–0.5 mm. = 12%
0.5–1 mm. = 64%
1–2 mm. = 21%

We claim:

1. A process for winning ammonia values as crystalline ammonium sulfate from a gas mixture containing ammonia, which comprises dividing the gas mixture into two streams, washing the first stream with a solution of ammonium sulfate and sulfuric acid to thereby neutralize the ammonia, converting the same to ammonium sulfate while maintaining the concentration of the ammonium sulfate in said washing solution approximately at saturation or lower, adding the first washing solution containing the ammonium sulfate to a second ammonium sulfate solution in which crystal development is occurring, contacting the second gas stream with the second ammonium sulfate solution containing sulfuric acid and a higher concentration of ammonium sulfate, and thereby forming well-defined sulfate crystals.

2. Process according to claim 1 in which said second gas stream is bubbled into a body of said second ammonium sulfate solution.

3. Process according to claim 1 in which said gas mixture is a reaction gas obtained in the production of acrylonitrile from propylene ammonia and oxygen, the reaction gas mixture containing nitrogen, oxygen, propylene, propane, ammonia, acrylonitrile, hydrocyanic acid, acetonitrile and catalyst dust, and in which the reaction gas mixture is initially washed with water to remove the organic polymers and catalyst dust.

4. Process according to claim 1 in which said well defined ammonium sulfate crystals predominantly have a grain size between about one-half to 1 millimeter.

5. Process according to claim 3 in which said first washing is effected in a jet washer.

6. Process according to claim 3 in which liquid droplets are separated from the reaction gas mixture prior to its separation into the two streams.

7. Process according to claim 3 in which concentration of the ammonium sulfate in the first mentioned washing solution of ammonium sulfate is maintained below saturation.

8. Process according to claim 7 in which the concentration of ammonium sulfate in the immersion washer is maintained at a value sufficient to allow the development of ammonium sulfate crystals of a grain size predominantly between about one-half to 1 millimeter.